Patented Nov. 4, 1952

2,616,850

UNITED STATES PATENT OFFICE 2,616,850

GREASE PREPARATION

George V. Browning, Hammond, Ind., assignor to Standard Oil Company, Chicago, Ill., a corporation of Indiana No Drawing. Application November 22, 1949, Serial No. 128,924

21 Claims. (Cl. 252—40.7)

This invention relates to improvements in the preparation of greases and particularly relates to the substitution of the liquid component of a lubricating grease with another liquid. More particularly the invention relates to a method for making a grease with a given vehicle utilizing the structure of the grease formed with another liquid vehicle.

Lubricating greases are usually formed with an oil and a soap by heating the two components together until a solution is formed or until the soap swells and imbibes the oil. Frequently, it is desired to replace the oil in such systems partially or entirely with another oil which is more viscous or less viscous than the oil already present therein. Again, it may be desirable to replace the liquid component of the grease with another liquid component of a different type, such as for example, replacing the oil component of a grease with a liquid polar component, such as for example, glycerine.

It is an object of the present invention to provide a method of replacing the liquid component of a grease with another liquid component. Another object of the invention is to replace the oil component of a lubricating grease with another liquid component without modifying the soap structure of said grease. Another object of the invention is to provide a method of preparing a lubricant grease containing a liquid vehicle from a lubricating grease containing a different liquid vehicle. Still another object of the invention is to provide a method of preparing a silicone grease from a grease comprising essentially a soap and a hydrocarbon oil. Another object of the invention is to provide a method of preparing a lubricating grease composed essentially of a soap and a synthetic normally liquid organic lubricant from a grease composed essentially of a soap and a mineral oil. Other advantages and objects will become apparent from the following description thereof.

In accordance with the present invention the liquid vehicle of a grease can be completely or partially replaced with another liquid vehicle without substantially modifying the structure of the grease by extracting or leaching the liquid vehicle originally present in such grease with a solvent, or successively with a plurality of solvents, until the desired amount of the original vehicle is extracted from the grease, adding the desired second liquid vehicle to the extracted grease containing the solvent, and removing the solvent therefrom by suitable means such as by atmospheric evaporation or the application of heat and/or vacuum.

Since the extraction is in the liquid phase the conditions at which the extraction takes place should be such that the liquid component being extracted as well as the solvent are in the liquid phase. The extraction is most suitably carried out at a temperature of from about −60° F. to about 200° F. and preferably at about 40° F. to about 100° F. It is to be understood that under superatmospheric pressures higher temperatures can be tolerated.

The present invention is applicable to the modification of solid or semi-solid greases of any type. Thus, the grease may be one comprising essentially a hydrocarbon oil and a soap, such as an alkali metal, alkaline earth metal, or a heavy metal soap, or mixtures thereof. The soap may be a soap of high molecular weight saturated and/or unsaturated carboxylic acids of at least about 10 carbon atoms, and preferably 16 carbon atoms or more, such as the soaps of lauric acid, stearic acid, hydroxy stearic acid, such as 12-hydroxy stearic acid, palmitic acid, myristic acid, oleic acid, or mixtures of such fatty acid as occur in coconut fatty acids, animal fats and/or fatty acids, fish oil fatty acids, vegetable oil fatty acids, hydrogenated fatty acids, stearin pitch from the distillation of hydrogenated fish and fatty acids, etc. The metal soaps of such acids can be, for example, the soaps of sodium, potassium, lithium, calcium, barium, strontium, aluminum, lead, zinc, tin, etc., or mixtures thereof. The grease can contain at least about 5% soap and as much as 65% or more soap. The invention, however, is not limited to greases of any particular soap content.

The liquid vehicle of the grease which can be replaced one for the other in accordance with the present invention can be any liquid lubricant, either natural or synthetic, capable of being used in grease compositions. Examples of such liquid vehicles are petroleum oils, synthetic hydrocarbon lubricating oils, such as for example, those obtained by the polymerization of olefins, or oils in the lubricating oil range obtained in the Fisher-Tropsch process. Other suitable synthetic oleaginous compounds within the lubricating oil viscosity range are the aliphatic dicarboxylic acid esters of the type disclosed in U. S. 2,450,222, such as the esters of sebacic, pimelic, azelaic, alkenyl succinic, alkyl maleic acids, etc. The esters of such acids are preferably the aliphatic esters, particularly the branched chain aliphatic esters, as illustrated by the following specific compounds: di-2-ethylhexyl sebacate, di-sec-amyl sebacate, di-2-ethylhexyl alkenylsuccinate, di-2-ethoxyethyl sebacate, di-2-(2′methoxyethoxy) ethyl sebacate, di-2-(2'-ethylbutoxy) ethylsebacate, di-2-butoxyethyl azelate, di-2-(2'-butoxyethoxy) ethyl alkenylsuccinate, triethylidene sorbitol, di-2-butoxyethyl alkenylsuccinate, etc. Other synthetic oleaginous compounds are the esters of a dihydroxy thioether, such as are disclosed in U. S. 2,451,895, silicone polymers, the monohydroxy 1,2 polyoxypropylene aliphatic monoethers of the type described in U. S. 2,488,644, and the like. In addition to the foregoing, the present invention is applicable to greases wherein a viscous polar compound, such as glycerine, is the liquid vehicle. Another example of a polar vehicle is found in certain silicone oils which are miscible only in polar solvents in which case a polar diluent such as an alcohol would be used in providing such polar vehicle in my process. While the present invention is particularly applicable to the substitution of the liquid vehicle in the grease prepared initially with a petroleum lubricating oil, the invention is not limited thereto but is applicable to the replacement of any liquid vehicle of a grease with another liquid vehicle.

The solvent or solvents employed for extracting or leaching the liquid vehicle from the grease should be so selected that the liquid being extracted, and the replacement liquid are soluble or miscible therein. If the two liquid vehicles have different solubilities or miscibilities, the grease is first extracted with a solvent in which the liquid vehicle, initially in the grease, is soluble or miscible, and then the grease successively extracted with solvents of different polarity until the final solvent is one which is mutually soluble or miscible with the replacement liquid. For example, in replacing an oil in a grease with a polar liquid such as glycerine, the grease is first extracted with a suitable hydrocarbon solvent until the oil is removed and the solvent in the soap structure of the grease is then successively extracted and replaced by more polar solvents until a solvent in which the glycerine is soluble is finally used. The amount of solvent used is not critical, since the volume used will depend upon the extent to which it is desired to remove the original vehicle in the grease.

The solvent employed is preferably one of low boiling point so that it can be removed simply by atmospheric evaporation or by means of a vacuum without the necessity of applying heat. It is to be understood, however, that the invention does not preclude the application of heat to remove such solvents; however, when heating is resorted to, to remove the solvent, the temperature required should be insufficient to decompose the grease structure or in any way substantially modify the grease structure. Usually, the solvent employed should have a boiling point below about 300° F. The type of solvent employed will be governed to some extent by the nature of the liquid vehicles involved, as well as the type of soap present in the grease.

In general, the use of solvents having a boiling point below about 200° F., or below the temperature at which the water of hydration in the grease will be removed, is preferred in the case of hydrous greases since solvents of higher boiling points are difficult to remove without the application of relatively high temperatures which will remove water of hydration required for stabilization of such soap structures. However, in the case of anhydrous greases, the use of higher boiling solvents is not objectionable. In general, it is preferred that non-polar solvents be used with sodium soap greases, as well as with hydrated greases of other metal soaps; the latter, however, can also be extracted with polar solvents, such as hereinafter described. Examples of non-polar solvents are low molecular weight hydrocarbons, preferably the paraffinic hydrocarbons from ethane to octane, inclusive; higher boiling paraffinic hydrocarbons, for example, those of about 10 carbon atoms, can also be used but the application of heat and/or vacuum distillation may be necessary to remove such solvents. In addition to paraffinic hydrocarbons, aromatic hydrocarbons, such as for example, benzene, toluene, etc., can be used for this purpose. Examples of suitable polar solvents for use in the herein-described invention are oxygenated aliphatic compounds, preferably those of less than 8 carbon atoms, such as alcohols, acids, ethers, esters, ketones, etc.

In extracting the grease it is desirable, although not essential, to conduct the extraction under conditions which will cause the least amount of disturbance of the soap structure. The stability of the soap structure varies with different soaps. For example, the soap structure in lithium soap greases is relatively stable and not readily disturbed or disrupted, whereas the soap structure of certain calcium soap greases is relatively easily disturbed or disrupted and becomes dispersed in the solvent. In cases wherein the soap becomes dispersed in the solvent it is advisable to allow the soap to settle and the supernatant liquid removed before adding the replacement vehicle; or such mixtures can be centrifuged prior to the addition of the replacement vehicle.

It has been observed that greases have a definite fiber structure which varies according to the type of soap used and the preparation of the grease. Thus, sodium greases have a definite fiber structure while greases other than sodium also contain soap fibers, although in some instances being so small that they cannot be resolved by an ultra microscope but can be photographed after being suitably magnified by an electron microscope. It is believed that in the extraction or leaching of the liquid vehicle from the grease by means of a solvent, the vehicle is removed from the fiber structure and replaced therein by a solvent. When the replacing liquid vehicle is added to the soap-solvent system and the solvent permitted to volatilize therefrom, the replacing liquid vehicle progressively replaces the solvent in the fibers of the soap structure thus forming the desired grease upon the complete removal of the solvent. A more thorough theoretical discussion of the structure of greases can be found in my paper, "A New Approach to Lubricating Grease Structure," delivered before the National Lubricating Grease Institute Convention at New Orleans, October 1949. While it is believed that the mechanism by which this replacement or substitution of liquid vehicles takes place as taught in this theoretical discussion, it is to be understood that this theory is a mere postulation and I do not wish to be limited or held thereto.

An application of the present invention is the preparation of silicone oil greases. Silicone oil greases cannot be readily prepared in the usual manner of merely heating together the soap and oil since a homogeneous mixture cannot be obtained in this manner. Instead two phases are invariably obtained with the silicone oil constituting one phase and the soap the other. This is particularly so in the case of lithium, calcium, aluminum and sodium fatty acid soap greases. However, by employing the herein-described invention, satisfactory homogeneous greases of silicone oil with lithium, calcium, sodium or aluminum fatty acid soaps are obtained as shown by the following examples:

EXAMPLE I

A lithium soap grease containing 7.3% soap and an oil having a Saybolt Universal viscosity at 100° F. of 360 seconds, was extracted with hexane until substantially all of the petroleum oil was removed from the soap. A silicone polymer oil having a Saybolt Universal viscosity at 100° F. of about 300 seconds in an amount equivalent in volume to the oil extracted was added to the soap-hexane system and the solvent permitted to evaporate. The recovered silicone grease had a consistency similar to that of the original grease and had a micropenetration of 98 compared to a micropenetration of 110 for the original grease.

EXAMPLE II

A calcium soap grease containing 15% calcium fatty acid soap and about 85% of petroleum oil having a Saybolt Universal viscosity at 100° F. of about 105 seconds was extracted as in Example I with hexane until substantially all of the petroleum oil was removed from the grease. An amount of a silicone polymer oil of the type used in Example I was added to the calcium soap-hexane system and the hexane permitted to evaporate. Calcium soap-silicone oil grease recovered had a micropenetration of 60 as compared to the micropenetration of 80 for the original calcium soap grease.

EXAMPLE III

Sodium soap grease containing 14% soda soap of a fatty acid and about 84% of a petroleum oil having a Saybolt Universal viscosity of 100° F. of about 260 seconds was repeated extracted with hexane until substantially all of the petroleum oil was removed, a silicone polymer oil such as was used in the preceding examples, equivalent in volume to the petroleum oil extracted, was then added to the sodium soap-hexane system and the hexane permitted to evaporate. The recovered soda soap-silicone oil grease had a micropenetration of 92 compared to a micropenetration of 89 for the original.

EXAMPLE IV

An aluminum soap grease containing 8% aluminum soap and about 82% of a petroleum oil having a Saybolt Universal viscosity at 100° F. of about 80 seconds was repeatedly extracted with ethyl ether until substantially all of the petroleum oil was removed. A silicone polymer oil of the type used in the previous examples, equal to the petroleum oil extracted, in volume, was added to the soap-ethyl ether system and the ethyl ether evaporated. The recovered grease having a consistency substantially that of the original grease had a micropenetration of 100 compared to a micropenetration of 104 on the original grease.

EXAMPLE V

An aluminum soap-silicone polymer oil grease was prepared as in Example IV except that the petroleum oil was extracted with hexane in place of the ethyl ether.

In order to determine the effect of working on the consistency of a grease containing a substituted silicone polymer oil the lithium soap grease of Example I containing petroleum oil and that containing the silicone polymer oil were each worked in a Hain micro-worker with a 250 mesh screen and micropenetrations were measured with 20 and 40 strokes. The results obtained are tabulated in the following table:

*Table*

| Strokes | 0 | 20 | 40 |
|---|---|---|---|
| Oil | 110 | 128 | 140 |
| Silicone | 98 | 100 | 124 |

The technique of the present invention for replacing the oil in the grease by a polar liquid is illustrated by the following examples:

EXAMPLE VI

A grease composition of 7.34 parts by weight of lithium stearate and 92.66 parts by weight of SAE 20 mineral oil was extracted several times with hexane, followed by successive extractions with ethyl acetate and ethyl alcohol. To the lithium soap-ethyl alcohol system was added glycerine in an amount equivalent to the oil extracted from the grease and the alcohol permitted to evaporate. The resultant glycerine-lithium stearate grease was white, had the appearance of a conventional grease and a micropenetration of 102 as compared to a micropenetration of 110 for the original lithium stearate oil grease.

EXAMPLE VII

The oil in a lithium 12-hydroxy-stearate grease was replaced by glycerine in the manner described in Example VI. The resultant lithium hydroxy stearate glycerine grease had an appearance of a conventional grease and a micropenetration of 61 as compared to a micropenetration of 71 for the lithium hydroxy stearate-grease.

The herein described invention which makes possible the replacement of a liquid vehicle in a grease composition by another liquid vehicle provides a facile method of preparing greases which are otherwise difficult to prepare, such as for example, the preparation of silicone polymer oil greases and greases in which polar liquids such as glycerine is the liquid vehicle. Where it is desired to incorporate in the grease components other than the oil and soap, such as for example anti-oxidants, metal deactivators, pourpoint depressors, extreme pressure agents, solid lubricants, such as graphite, mica, etc., these may be added after the replacement liquid has been incorporated in the grease. Such additives can be initially incorporated in the grease provided the solvent or solvents employed in the described process are not solvents for such additives; under circumstances in which the additive may be removed by the solvent action of the solvent, it is necessary to replace the same.

While I have described my invention by reference to specific examples thereof, these have been by way of illustration only and the invention is not to be limited thereby, but includes within the scope such modifications as come within the spirit of the appended claims.

I claim:

1. The method of preparing a grease comprising extracting a grease, comprising a normally liquid organic lubricant and a soap of the high molecular weight carboxylic acid, with a solvent to remove said liquid organic lubricant from said grease, adding a second normally liquid organic lubricant soluble in said solvent to the solvent-soap system and evaporating said solvent.

2. The method of claim 1 in which the solvent is a hydrocarbon solvent.

3. The method of claim 1 in which the solvent is a paraffinic hydrocarbon of not more than about 8 carbon atoms.

4. The method of claim 1 in which the solvent is hexane.

5. The method of claim 1 in which the solvent is a polar solvent having a boiling point not higher than about 300° F.

6. The method of claim 1 in which the solvent is an oxygenated organic compound having a boiling point of not more than about 300° F.

7. The method of claim 1 in which the solvent is a low molecular weight aliphatic alcohol.

8. The method of claim 1 in which the solvent is a low molecular weight aliphatic ether.

9. The method of preparing a grease comprising extracting a grease, comprising essentially a mineral lubricating oil and a soap of a high molecular weight carboxylic acid, with a normally liquid solvent to remove at least a portion of said mineral lubricating oil from said grease, adding a second normally liquid oleaginous material soluble in said solvent to the solvent-soap system, and finally evaporating said solvent.

10. The method of preparing a lubricating grease comprising extracting a lubricating grease, comprising a normally liquid organic lubricant and a soap of high molecular weight carboxylic acid, successively with a plurality of solvents, adding a second normally liquid organic lubricant to the mixture of soap and final solvent, and evaporating said solvent, the polarities of the successive solvents used varying progressively such that the second normally liquid organic lubricant is soluble in the final solvent employed.

11. The method of preparing a silicone polymer oil grease comprising extracting a grease, comprising essentially a mineral lubricating oil and a soap of a high molecular weight carboxylic acid, with a normally liquid paraffinic hydrocarbon solvent having not more than 8 carbon atoms until substantially all of said mineral lubricating oil is extracted from said grease, adding a silicone polymer oil to the solvent-soap system, and evaporating said solvent therefrom.

12. The method of claim 11 in which the soap is an alkali metal soap.

13. The method of claim 11 in which the soap is a lithium soap.

14. The method of claim 11 in which the soap is a lithium hydroxy stearate.

15. The method of claim 11 in which the soap is a sodium soap of a high molecular weight carboxylic acid.

16. The method of claim 11 in which the soap is an alkaline earth soap of a high molecular weight carboxylic acid.

17. The method of claim 11 in which the soap is a calcium soap of a high molecular weight carboxylic acid.

18. The method of claim 11 in which the solvent is hexane.

19. The method of preparing a glycerine grease comprising extracting a grease, comprising essentially a mineral lubricating oil and a soap of a high molecular weight carboxylic acid, successively with an aliphatic acetate and an alcohol until substantially all of the mineral lubricating oil is removed from said grease, adding glycerine to said alcohol-soap system and evaporating the alcohol therefrom.

20. The method of preparing a glycerine grease comprising extracting a grease, comprising essentially a mineral lubricating oil and a soap of a high molecular weight carboxylic acid, successively with a normally liquid paraffinic hydrocarbon solvent, a normally liquid aliphatic ether and a normally liquid aliphatic alcohol until substantially all of the mineral lubricating oil is removed from said grease, and said alcohol has permeated said soap, adding sufficient glycerine to the alcohol-soap system to displace said alcohol, and evaporating the alcohol therefrom.

21. The method of claim 20 in which the soap is a lithium hydroxy stearate.

GEORGE V. BROWNING.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,446,177 | Hain et al. | Aug. 3, 1948 |
| 2,554,222 | Stross | May 22, 1951 |